Jan. 18, 1949.　　　　　M. W. SCHWARTZ　　　　　2,459,243
REFRIGERATED DISPLAY CABINET
Filed May 21, 1945　　　　　　　　　　　　　　　2 Sheets-Sheet 1
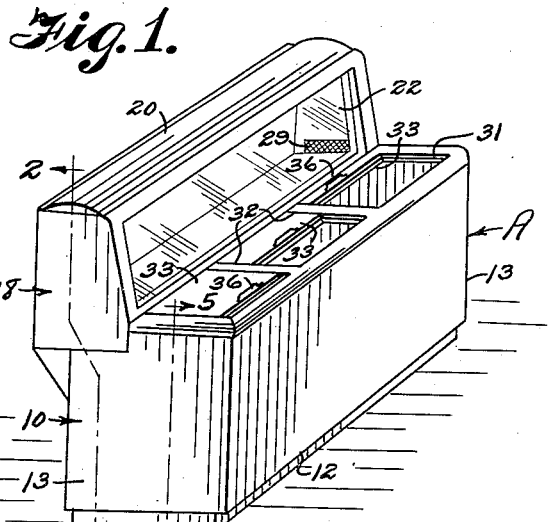
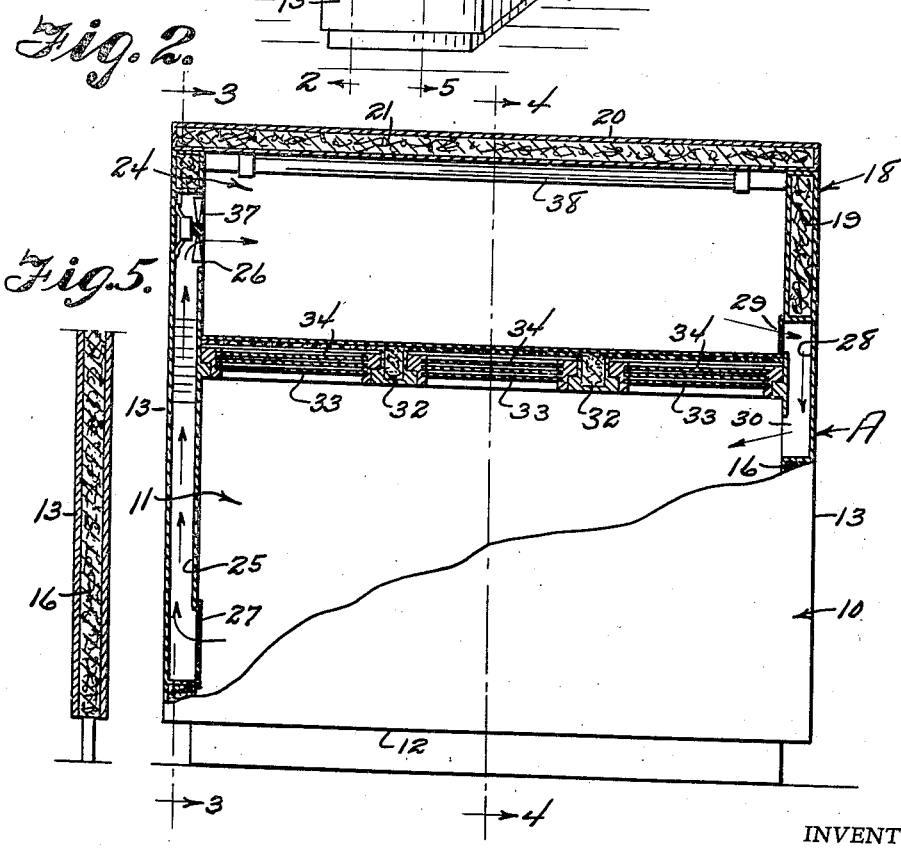
INVENTOR.
Max W. Schwartz
BY Victor J. Evans & Co.
ATTORNEYS Jan. 18, 1949. M. W. SCHWARTZ 2,459,243
REFRIGERATED DISPLAY CABINET
Filed May 21, 1945 2 Sheets-Sheet 2
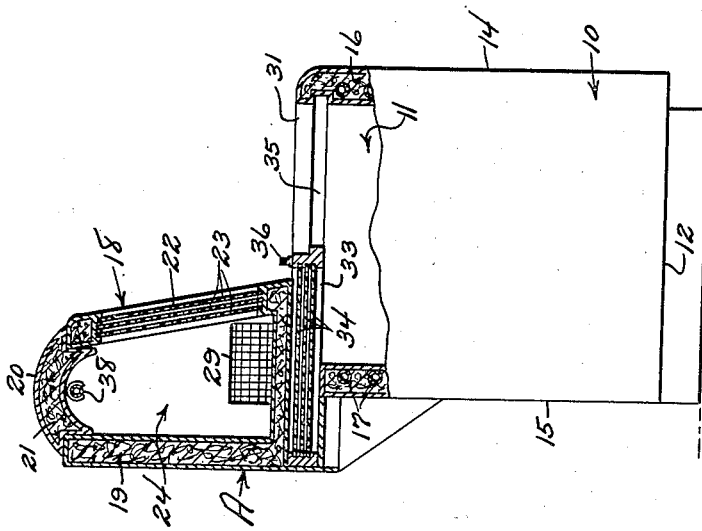
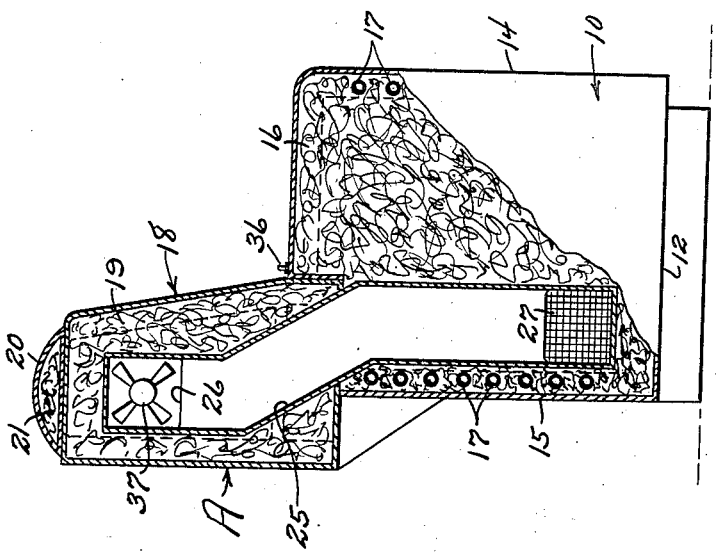
INVENTOR.
Max W. Schwartz
BY Victor J. Evans & Co.
ATTORNEYS Patented Jan. 18, 1949

2,459,243

UNITED STATES PATENT OFFICE 2,459,243

REFRIGERATED DISPLAY CABINET

Max W. Schwartz, New Castle, Pa.

Application May 21, 1945, Serial No. 595,037

5 Claims. (Cl. 62—89.5)

The invention relates to frozen food display and storage cases or cabinets, and more especially to refrigerated display and storage cabinets, of the type known as "Self-Serve" cabinets wherein the purchaser may make his selection of frozen food from the foods on display in the upper section, and serve himself from the packaged stock contained in the lower section without aid from store personnel, and where two or more persons may withdraw their selected foods simultaneously, due to a plurality of sliding lids.

In cabinets for frozen foods with which I am acquainted, the construction usually consists of an insulated chest type of container provided with a flat top formed with access openings having insulated hinged or lift-out lids. As a consequence, there is no display of the contents of the cabinet unless the lids are removed or left open in which case it is required that the refrigerating mechanism be run more than is usual to compensate for the heat due to removal of the lids, and an undue amount of frosting of the products. Sales of frozen foods are poor with this type of cabinet, since the buyer cannot ordinarily view the contents. Surveys by manufacturers and processors of frozen foods disclose that sales increase considerably when the lids are left open or entirely removed. Cabinets which are provided with a horizontal slidable lid with transparent inserts are subject to disadvantages, since in sliding one lid, it is drawn over the other lid, thus closing one-half of the cabinet, and usually limiting withdrawals to one person at a time. My present inventon, among other things, eliminates the above and other objectionable features of other cabinets with which I am acquainted, and provides an efficient display of all frozen foods at eye level which will attract customers from a distance. My invention permits display of frozen food without packages or wrappers and in an attractive manner so that prospective purchasers may make a choice without loss of time, and my cabinet also allows access by more than one purchaser at a time.

The primary object of the invention is the provision of a cabinet of this character, wherein a display of frozen food products can be had at a high level, thus making these clearly visible from a distance with respect to the said cabinet, and in this manner attracting prospective purchasers, the cabinet being of novel construction and unique in its arrangement.

Another object of the invention is the provision of a cabinet of this character, wherein the display compartment is cooled in a unique manner from refrigeration created within the lower section of the cabinet, and varied degrees of temperature due to stratification of air eliminated, this being effected by air currents directed by an electric fan to provide uniform temperatures and circulation of air, which fan is located hidden from view, the food products being displayed through a transparent front panel at the upper portion of the said cabinet, the food products identified therein being acquired from the lower section of the latter, thus eliminating any disturbance to this upper section. Furthermore, optional refrigeration means, such as those used in the lower section may be used to refrigerate the upper section.

A further object of the invention is the provision of a cabinet of this character, wherein free accessibility is had thereto, thus making it possible to serve two or more customers at the same time with convenience and dispatch, the display area of the said cabinet being electrically illuminated for a full and complete display of content therein.

A still further object of the invention is the provision of a cabinet of this character, which is simple in construction, thoroughly reliable and efficient in its purposes, strong durable, neat and attractive in appearance, thoroughly sanitary, enabling full display of the products of that kind stored within such cabinet, it being a satisfying store fixture, and inexpensive to manufacture and install.

With these and other objects in view, the invention consists in the features of construction, combination and arrangement of parts as will be hereinafter more fully described, illustrated in the accompanying drawings, which show the preferred embodiment of the invention, and pointed out in the claims hereunto appended.

In the accompanying drawings:

Figure 1 is a perspective view of the cabinet constructed in accordance with the invention.

Figure 2 is a sectional view taken approximately on the line 2—2 of Figure 1 looking in the direction of the arrows.

Figure 3 is a sectional view taken on the line 3—3 of Figure 2 looking in the direction of the arrows.

Figure 4 is a sectional view taken on the line 4—4 of Figure 2 looking in the direction of the arrows, and Figure 5 is a section on the line 5—5 of Figure 1 showing insulation on end walls of cabinet.

Similar reference characters indicate corresponding parts throughout the several views in the drawings.

Referring to the drawings in detail, A designates generally the cabinet in its entirety constructed in accordance with the invention, and comprises a lower body section 10, forming interiorly thereof refrigerator compartment 11, which may be divided or undivided, this being optional. The bottom 12, ends 13, front 14 and back 15, respectively, creating the walls thereto are suitably insulated, as at 16, best seen in Figures 2, 3 and 4, of the drawings.

Confined within the front and back and end insulated walls 14 and 15 are refrigerating coils 17 for the refrigeration of the compartment 11, and the refrigeration may be of any well-known kind, involving mechanism, not shown, of standard contruction.

Rising vertically from the top of the body section 10 and slightly overslung to the back 15 thereof is an upper display section 18, which has its permanent walls insulated at 19, while the top, which is open, is fitted with a removable cover section 20 having interior insulation 21, and a glass panel front 22, which is made up of a group of glass panes 23 arranged in this instance side-by-side, and fitted in the front 22 for sealing it. The interior of the section 18 forms a display compartment 24, for frozen food products stored therein for visibility through the front 22.

Built in to the sections 10 and 18 at companion ends therein is a cold air circulating flue 25, which through registers 26 and 27, respectively, communicates with the compartments 11 and 24, so that cold air can pass from the said compartment 11 to the compartment 24, as best seen in Figures 2 and 3 of the drawings. The sections 10 and 18 at the other companion ends have built therein another flue 28, it having communication with the compartments 11 and 18 through registers 29 and 30, respectively, this flue 28 being a return duct for the spent cold air delivered to the compartment 24.

The forward open top 31 of the body section 10 has formed therewith parting strips 32 for sliding lids 33, each having glass panel centers 34, so that the interior of the section 10 is visible from without.

In the path of movement of the lids 33 and built between the sections 10 and 18 is a runway 35 for such lids, which are manually operated, and are provided with handles 36 for this purpose.

Located within the flue 25 rearwardly of the register 27 is an electric fan 37 for effecting the circulation of cold air from the section 10 to the section 18, as will be apparent.

Within the compartment 24 and suitable supported for the best advantages is an electric illuminating medium 38, which can be of any approved type, so that the products stored within the said compartment can be fully displayed and made clearly visible through the front 22 of this section 18.

The cabinet A is for the display of food producs, both within the lower and upper sections thereof, while the upper section enables the display thereby at approximately eye level from a distance, in view of its elevation.

What is claimed is:

1. A cabinet of the character described, comprising a lower body section having horizontally disposed and transversely slidable lids provided with transparent portions, an upper section extended above the lower section including a compartment separated from the lower section and having a permanent transparent front panel, refrigerating means positioned in the lower section, and means for circulating cold air from the lower section to the upper section, said cabinet having a passage for the return of the air to the lower section.

2. A cabinet of the character described, comprising a lower body section having horizontally disposed and transversely slidable lids provided with transparent portions, an upper section extended above the lower section including a compartment separated from the lower section and to the rear thereof and having a permanent transparent front, a refrigerating means positioned in the lower section, and means for circulating cold air from the lower section to the upper section, said cabinet including air flow ducts for the admission and exhaust of cold air from one section to the other.

3. A cabinet of the character described, comprising a lower body section having horizontally disposed and transversely slidable lids moving rearwardly to the open position and provided with transparent portions, an upper section extended above the lower section and having a permanent transparent front, refrigerating means positioned in a wall of the lower section, and means for circulating cold air from the lower section to the upper section, and said cabinet including air flow ducts in the walls thereof for the admission and exhaust of cold air from one section to the other.

4. A unitary refrigerator case comprising a first bottom insulating wall, side insulating walls extending upwardly and about the same and a top lid structure attached to said side walls whereby a lower box-like storage compartment is formed, said top lid structure having a plurality of longitudinally-spaced transversely directed openings for access to the compartment interior, guideways spaced about and longitudinally of said openings, lids slidably mounted in said guideways, a second insulating bottom wall secured to said top lid structure and transversely offset from the same, side walls extending upwardly and about said second insulating bottom, a lid cover removably supported on said latter side walls, said second bottom, latter walls and lid cover forming a display compartment separate from said storage compartment, a first flue within corresponding side walls of said compartments extending between and communicating with the interiors thereof, a second flue within corresponding side walls located opposite said first mentioned corresponding side walls and extending between and communicating with said compartment interiors, fan means within one of said flues for maintaining air circulation between said compartment interiors through said flues and refrigerating means within the storage compartment for cooling the interior of the same.

5. A unitary refrigerator case comprising a lower storage compartment, refrigerating means for cooling the interior of the same, an upper display compartment offset transversely from and attached to the top of said storage compartment, a primary flue means extending between said lower storage and upper display compartments and in communication with the lower portion and the upper portion, respectively, of said compartment interiors, a secondary flue means extending between said storage and display compartments and in communication with the upper and the lower portions, respectively, of said compartment interiors, means cooperating with one of said flue means for circulating the air between the compartment interiors, said lower storage compartment having in its upper portion a plurality of longitudinally-spaced transversely directed openings whereby contents may be withdrawn from said lower storage compartment, guideways on said lower storage compartment and extending between said compartments and transversely thereof and lids slidably mounted in said guideways for closing said openings.

MAX W. SCHWARTZ.

REFERENCES CITED

The following references are of record in the file of this patent:

UNITED STATES PATENTS

| Number | Name | Date |
| --- | --- | --- |
| 2,032,234 | Thomas | Feb. 25, 1936 |
| 2,152,291 | Starr | Mar. 28, 1939 |